United States Patent [19]

Jackson

[11] Patent Number: 4,509,963
[45] Date of Patent: Apr. 9, 1985

[54] INDUSTRIAL VACUUM CLEANER

[75] Inventor: Carroll V. Jackson, Northbrook, Ill.

[73] Assignee: Wm. W. Meyer & Sons, Inc., Skokie, Ill.

[21] Appl. No.: 570,753

[22] Filed: Jan. 16, 1984

Related U.S. Application Data

[63] Continuation-in-part of Ser. No. 364,423, Apr. 1, 1982, abandoned.

[51] Int. Cl.$^3$ .............................................. B01D 50/00
[52] U.S. Cl. ........................................ 55/324; 55/314; 55/334; 55/356; 55/429; 15/340; 15/353
[58] Field of Search ................. 55/323, 320, 324, 319, 55/312–314, 341 R, 334, 335, 429, 356, 467, 473; 15/340, 352, 353

[56] References Cited

U.S. PATENT DOCUMENTS

| | | | |
|---|---|---|---|
| 2,453,951 | 11/1948 | Vedder | 55/334 |
| 3,643,993 | 2/1972 | Asadurian | 220/1.5 |
| 3,842,461 | 10/1974 | Wurster | 15/340 |
| 3,870,489 | 3/1975 | Shaddock | 55/314 |
| 3,973,935 | 8/1976 | Moore et al. | 55/314 |
| 4,017,281 | 4/1977 | Johnstone | 55/334 |
| 4,195,744 | 4/1980 | Christianson | 220/1.5 |
| 4,224,043 | 9/1980 | Dupre | 55/319 |
| 4,227,893 | 10/1980 | Shaddock | 15/340 |

OTHER PUBLICATIONS

Unicage Type VC Vertical Cylindrical Dust Collector–Young Machinery Co. Inc., Muncy, Pennsylvania, 7-14-67, Bulletin 233-200.

Primary Examiner—Bernard Nozick
Attorney, Agent, or Firm—Brezina & Buckingham

[57] ABSTRACT

A vacuum cleaner and refuse and debris collection and disposal device and system utilizing a vacuum cleaning unit, with intake for both wet and dry materials, utilizing a motor-driven blower to create a vacuum in a sealed vacuum chamber and a separate internal debris collection container which is removable without disturbing the sealing properties of the vacuum chamber. The container is alternatively emptyable or disposable, thereby providing minimal interruption in the operation of the vacuum cleaner unit, no relocation of the unit when dumping is necessary and the use of replaceable, or disposable internal collection containers subject to wear and tear without disturbing the sealing properties of the vacuum chamber.

12 Claims, 4 Drawing Figures

INDUSTRIAL VACUUM CLEANER

This application is a continuation-in-part application relating to application Ser. No. 364,423 filed Apr. 1, 1982 now abandoned.

FIELD OF THE INVENTION

The present invention relates to vacuum cleaner devices, waste collection components thereof, and disposal systems.

BACKGROUND OF THE INVENTION

A. Discussion of the Prior Art

Vacuum cleaners of various types and other waste material collection devices are known in the prior art. These devices generally are of relatively small capacity intended for household use and including the feature of portability, or of very large size intended for industrial use and requiring sophisticated material-handling techniques, or extensive installations for the handling and disposal of waste material collected by the vacuum cleaner and moving said materials to their ultimate disposal point.

One common method used in certain vacuum cleaning devices is to utilize a porous container which serves as both filter and waste collection container. This porous filter container is sealed around the inlet thereto, and a vacuum applied in a chamber behind said filter container and causing the air medium containing the waste particles to move therethrough, resulting in the entrapment of said waste particles in the filter bag. The filter bag element in this application requires its sealing both to the inlet thereto, through which the gaseous medium containing the waste particles can pass, and is further required to be sealed on its exterior portion with the vacuum chamber itself.

The invention is distinguished from this first type of device through its use of an enlarged vacuum chamber of relatively large size compared to the dimensions of the intake pipes, which results in the creation of a relatively high vacuum at the intake end and throughout the length of the intake pipe system, with a corresponding decrease in the velocity of the airflow upon entry into the vacuum chamber, which operates in conjunction with a system of baffles and filters for dry material pickup and a filter system for wet medium pickup, serving to filter out waste material particles prior to entry into the blower intake mounted direcatly behind the filter and baffle system.

A second type of small application vacuum cleaner is of the cannister-type commonly used in small workshops, utilizing a nonpermeable liner which is itself sealed around its opening between the drum of the unit and the topmost plate containing the vacuum machinery. The emptying of said inner container or liner in this application is accomplished by the removal of the entire power and suction unit from the lower drum portion of the device, and the flexible liner removed therefrom. In this device, the flexible liner is of an impermeable material so as to facilitate the collection of the waste material, but must be perforated around its uppermost portion to permit the application of the vacuum in order to cause the gaseous medium containing the waste material in suspension to pass therethrough.

The invention avoids the drawbacks of this second prior art device in that it utilizes a large size framework, custom designed for the task it is expected to perform, rather than the use of light-weight, relatively small and low-powered unit for placement on standard drum containers. Similarly, the invention avoids the use of the liner which must be sealed around the total periphery of the outer container at the juncture with the plate bearing the operating mechanism of the device. Similarly, the internal collection device in the invention can be manufactured to whatever dimensional and structural criteria are suitable to the job, rather than the use of a limited plastic film liner with perforations along its upper periphery. The prior art would obviously be unsuitable for the collection and removal in the inner carrier of heavy or sharp materials.

In the area of industrial vacuum cleaners, both fixedly mounted and mobile types are known. In many applications a centrally located vacuum unit can be connected to various inlet openings located strategically throughout a plant or factory. Whether by use of a pulsating airflow, implosion, or relatively continuous suction, the method of disposal of the waste material from the central location has required the manual unloading of a hopper fixedly mounted with the unit.

In the case of mobile industrial vacuum cleaners, greater flexibility was permitted in the prior art in the unloading of the waste material when compared to that of the fixedly mounted units. Although some mobile industrial vacuum cleaners retain the manual unloading feature through access doors, or the like, the mobility of the unit permitted the movement of the entire vacuum cleaner to a suitable dump site, from which it could then be unloaded. The means of unloading said devices included, in addition to the mere use of access doors, containers which are an integral part of the vacuum system. These containers commonly are pivoted, or hinged, so that they may be disconnected from the housing of the vacuum unit and dumped by pivoting from a substantially vertical position to a position with the opening facing substantially sideward or downward. Other applications use a pivoting to a dumping position following disconnection from the power source and other support machinery. In various applications mobile industrial vacuum cleaners utilize either completely separable components permitting the container to be moved a substantial distance from the main housing, or require that the entire vacuum cleaner unit be moved near the dump site.

To the best of applicant's knowledge, there are no comparable units presently available, nor are there any U.S. or foreign patents disclosing such a unit.

B. Objects of the Invention

The present invention relates to a heavy duty vacuum cleaning device and system whereby an inner waste collection container is wholly contained within a sealed vacuum chamber. The collection container is not itself sealed along its ingress or egress so as to be gas-tight. The vacuum chamber is openable to facilitate the removal and replacement of the container through the use of standard material handling equipment. This permits the dumping of the waste material at a convenient location, enabling the vacuum cleaner device to be kept at or near the workplace while requiring the movement of the simplest, most economical and most expendable component.

The invention improves upon the performance, reliability and flexibility in use of heavy duty vacuum cleaners through the utilization of a separate removable waste material containers within the sealed vacuum chamber. Said waste material containers are removable through the use of standard material handling methods, either manually or using typical equipment, such as forklift trucks. The various configurations of collection containers are capable of being substituted for one-another with little or no modification to the main housing of the industrial vacuum cleaner. The containers are in various configurations disposable and sealable. The internal waste collection container is directly subject to the collection of waste material which is heavy, sharp, corrosive, abrasive, or otherwise likely to cause damage. Damage from bending, denting, abrasion, cutting, or wearing of the collection chambers is not provided for in prior art applications. The use of a separate, removable collection container permits the vacuum chamber to maintain the gas-tight configuration essential to the correct and efficient operation of the apparatus as a whole.

The invention avoids the requirement that the container receiving the waste material be either an integral, semi-permanent part of the vacuum cleaning unit as a whole, or a self-contained sub-unit of an entire system with its own support and transportation means, as well as sealing means and separate waste material ingress means.

The internal waste collecting container of the invention can be made sufficiently structurally sound to withstand the forces exerted as as result of bing subject to dropping or impacting of waste material of variable velocity, shape, size and density. However, the container may be made sufficiently light and relatively portable, and manufactured in a sufficiently economical manner so as to facilitate ready replacement and substitution.

The internal waste collection container can perform its function of merely collecting and facilitating the dumping of waste materials over a relatively greater useful life than comparable prior art collection devices and systems despite inevitably being subject to the aforesaid forces causing damage as a result of their proximity with the waste materials collected can suffer a greater degree of damage. This is accomplished because it is contained within a wholly sealed vacuum chamber rather than being itself wholly or partially sealed so as to retain the essential gas-tight nature within the system as a whole. This also enables the components most subject to wear and tear to be constructed in a more economical manner.

The invention utilizes an internal vacuum chamber of sufficient dimensions to enable the use of various configurations of internal collection containers specifically tailored to the nature of the applications in which it is used and the type of material to be collected. These applications include: utilization of bottom unloading hoppers in the event of large, heavy, bulky materials; internal containers rendered liquid-tight along their bottom and sides for the collection of liquid, viscous, or particulate matter suspended in liquid; the use of inexpensive, lightweight, disposable inner containers; and the use of inner containers which may be totally sealed upon removal from the industrial vacuum cleaner unit itself in the event of the disposal of harmful materials, or the like.

The invention provides two separate inlet pipes. One is specifically designed for the intake and collection of substantially wet matter, using piping particularly suited to that collection. The other is designed for intake of substantially dry matter, utilizing an intake pipe and deflector plate combination.

The use of the alternative wet and dry modes of operation is accomplished through the use of the valves or fittings which permit the closure of the wet mode vacuum chamber blower intake when operation in the dry mode is desired, or the closure of the dry mode blower intake, which is connected in series through the dry mode filter housing, and the opening of the wet mode vacuum chamber blower intake when operation in the wet mode is desired. This eliminates the requirement for further physical separation of the two intake and filter assemblies and permits the use of common blower intake between the selector valve and the blower itself. Location of the wet blower intake with its opening below the level of the bottom of the dry mode filter bags avoids the saturation of the filter bag assembly with moisture of solvent. In order to preserve the gas-tight nature of the vacuum chamber, the unused waste material intake is sealed from the exterior using a cover or plug.

GENERAL DESCRIPTION OF THE INVENTION

Figure 1:
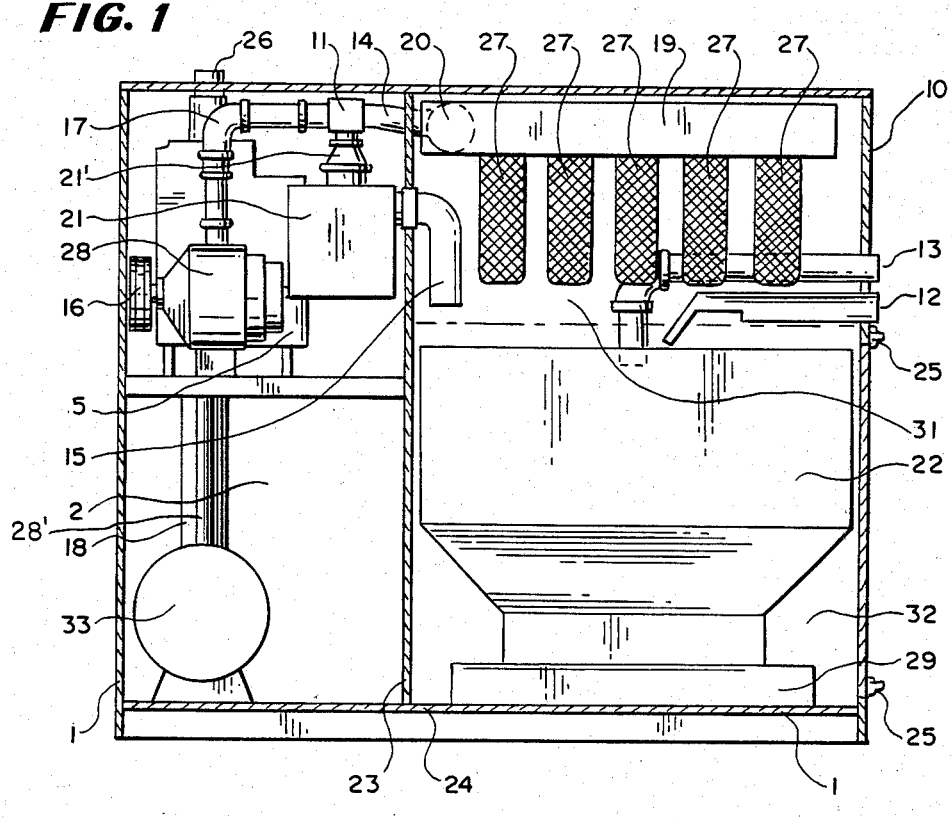
FIG. 1 is a right side sectional view of the industrial vacuum cleaner unit.

The invention can be viewed as having four interrelating component groups. In visualizing the operation it is useful to view these in an order corresponding to the flow of the air through the device.

The intake phase involves a nozzle and flexible conduit enabling an operator to pick up waste materials. The waste materials are carried through the conduit to one of two inlets. The unused inlet is closed through affixation of a cover or plug. The inlet components extend inwardly from the connection with the conduit and reach terminations centrally located within the vacuum chamber. One inlet is designed for wet material pickup, being constructed of tubing or pipe, and terminating in a downward extension directly above the center of the collection container following an approximately 90° bend. The second inlet is designed for dry material pickup, its horizontal segment extending inwardly beneath the wet intake and terminating before the downward extension of the wet intake. The dry intake terminates with an opening across which is affixed a deflection place deflecting dry waste in a downward direction and spreading it evenly into the collection container.

The second grouping of components includes those relating to the vacuum chamber. The walls, bottom and forward bulkhead are of unitized welded construction, or are all affixed to a framework. The top of the vacuum chamber is provided with a permanently affixed cover unit surrounding the filter unit and of smaller dimensions than the lower section, to provide minimal interior space exclusive of the inner container and filter unit. Access to the filter units is provided by removal of sealed access panels in the roof of the top cover. Access to the waste collection container is provided through rearwardly opening doors. Gaskets or other sealing methods are provided, so that when the doors are closed a gas-tight chamber results.

A vacuum is induced through the use of a blower operating either through a blower inlet used in conjunction with the wet waste inlet, or through an alternative blower inlet through the filter assembly in conjunction with the dry waste inlet. With these exceptions, the vacuum chamber is sealed and gas-tight. The wet material blower intake is directly open to the vacuum chamber, air passing through a coarse, canister-type filter, thence through a series of piping to the selector valve and then to the blower. The opening for the wet mode blower inlet pipe is at a level below the bottom-most part of the filter bags. Upon closing the selector valve for the wet blower intake, thus opening the piping for the dry intake, air proceeds from the vacuum chamber through fine particulate filter bags, through the filter bag assembly, through a secondary filter, thence through a series of piping through the selector valve and then into the blower.

The selector valve in the preferred embodiment is of a type known as a three way plug valve. This type of valve automatically closes one mode when the other mode is selected. Other embodiments could be used to accomplish the same purpose, such as the use of two simple two position valves and a "Y" shaped pipe fitting. This embodiment would require the manual setting of the two valves, one in the open and the other in the closed position, for proper operation. Another alternative would be to simply disconnect a pipe from one mode and place a cap on that mode's blower inlet pipe, and to connect a pipe from the other mode's blower inlet pipe to the common blower inlet.

The final grouping is that the power supply, mechanical and exhaust components. These components are located forward of the vacuum chamber bulkhead. The blower is connected through a common series of intake piping, as previously noted, to a selector valve from which either wet or dry intake is selected. The blower is mechanically driven through a belt drive from a self-contained motor. The blower discharges into a discharge assembly including discharge piping, a muffler and an exhaust pipe vented upwards through the top of the mechanical component housing. The mechanical component housing provides for safety, sound attenuation, and protection of the components from the environment. The mechanical components, being exterior to the vacuum chamber, require only sealing of the respective piping assemblies, hence the housing can be constructed of relatively lighter sheet metal and provided with various unsealed access panels for maintenance and inspection.

DETAILED DESCRIPTION OF THE DRAWINGS

FIG. 1 is a right sectional view of the invention. In the vacuum chamber grouping the waste material inlets 12 and 13, blower inlet 14 and collection container 22 are apparent. The basic framework of the device is indicated at reference numeral 1. The dry waste material intake 12, is shown terminating in the deflection plate near the center of the vacuum chamber 31, and over the waste collection container 22. Above and slightly forward of the dry waste material intake is the wet waste material intake 13. Located in the top of the vacuum chamber and surrounded by the cover member 10, is the filter bag manifold 19. Several individual filter bags 27, are visible. Located within the filter housing 19 is the secondary filter 20. This manifold passes through the bulkhead 23, and into the machinery section 2, being connected through the dry mode blower intake piping 14.

The wet mode blower intake 15, is mounted on the bulkhead 23, and extends downward below the level of the lowest part of the filter bags. In extending forward through the bulkhead, this manifold leads into the wet mode blower intake canister filter 21. The cannister type filter is well known in the automotive (trucking) field, wherein after a filter cartridge in the cannister becomes clogged, the cannister is disconnected and the cartridge is replaced or cleaned. In the preferred embodiment, the cartridge or filter element is a course metal mesh which filters out large water droplets and supsended particulates. During the dry mode operation, the flow from the cannister type filter 20 is conducted by the piping 14 through the selector valve 11 into the common inlet piping manifold 17 from whence, as is apparent in FIG. 1, the flow continues through the blower 28 through an exhaust pipe 28' to the silencer 33 to the discharge piping manifold 18 for exit to the atmosphere through an opening 26. Similarly, the output from the filter housing 21 is connected by a conduit 21' to the selector valve 11 from whence it is directed to the common blower inlet piping manifold 17 and eventually exited to the atmosphere.

From the selector valve the common blower inlet piping manifold 17, leads to the blower 28. Operation of the blower is accomplished through the use of a drive mechanism 16, driven by the motor 5. Upon passing through the blower pressurized air passes through a silencer 33, to the blower discharge piping manifold 18, and is then exhausted into the atmosphere through the exhaust outlet 26.

Figure 2:
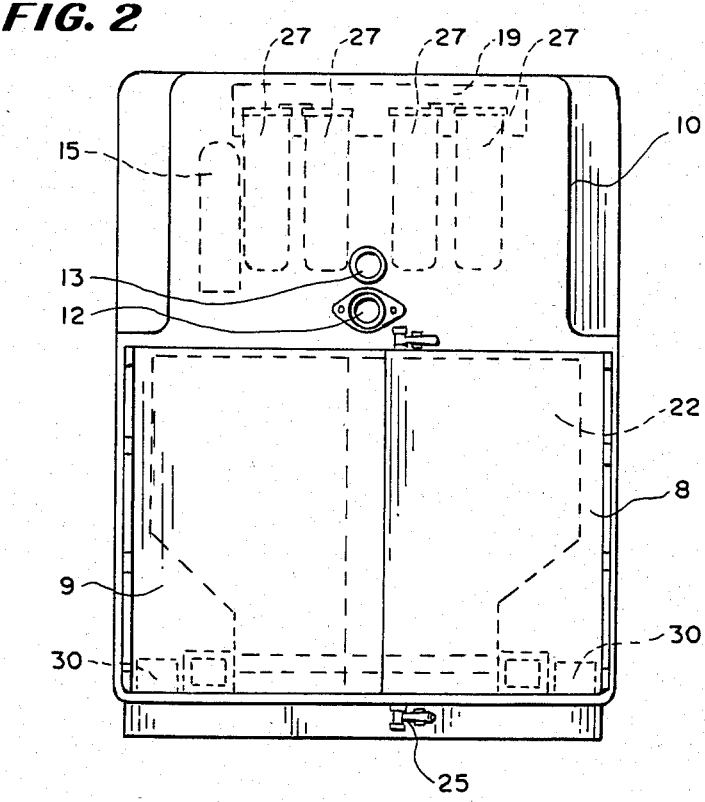
FIG. 2 is a front plan view of the invention.

FIG. 2 is a front plan view of the industrial vacuum cleaner unit showing the disposition of the filter bag manifold 19, with mutliple filter bags 27. The filter bag collector assembly is enclosed by the filter bag collector manifold 10, access for which is provided through access panels. FIG. 2 further shows the inner waste collection container 22, in position for operation of the unit with the disposition of the removal engagement channels 29.

In the preferred embodiment support rails 30, are incorporated which provide a raised surface upon which any suitable flat-bottomed container may be placed which provides sufficient clearance between the bottom of any alternative container and the floor of the vacuum chamber to permit the insertion of the lifting portions of standard material handling equipment. Further apparent in FIG. 2 is the placement of rear doors 8 and 9 disposed so as to provide complete removal of the inner waste collection container 22, when in their opened position. The cam locking mechanism 25 is used to close and lock said doors in their sealed position, thereby providing a gas-tight vacuum chamber so designed to minimize damage, wear and tear resulting from direct contact with the waste materials collected.

Figure 3:
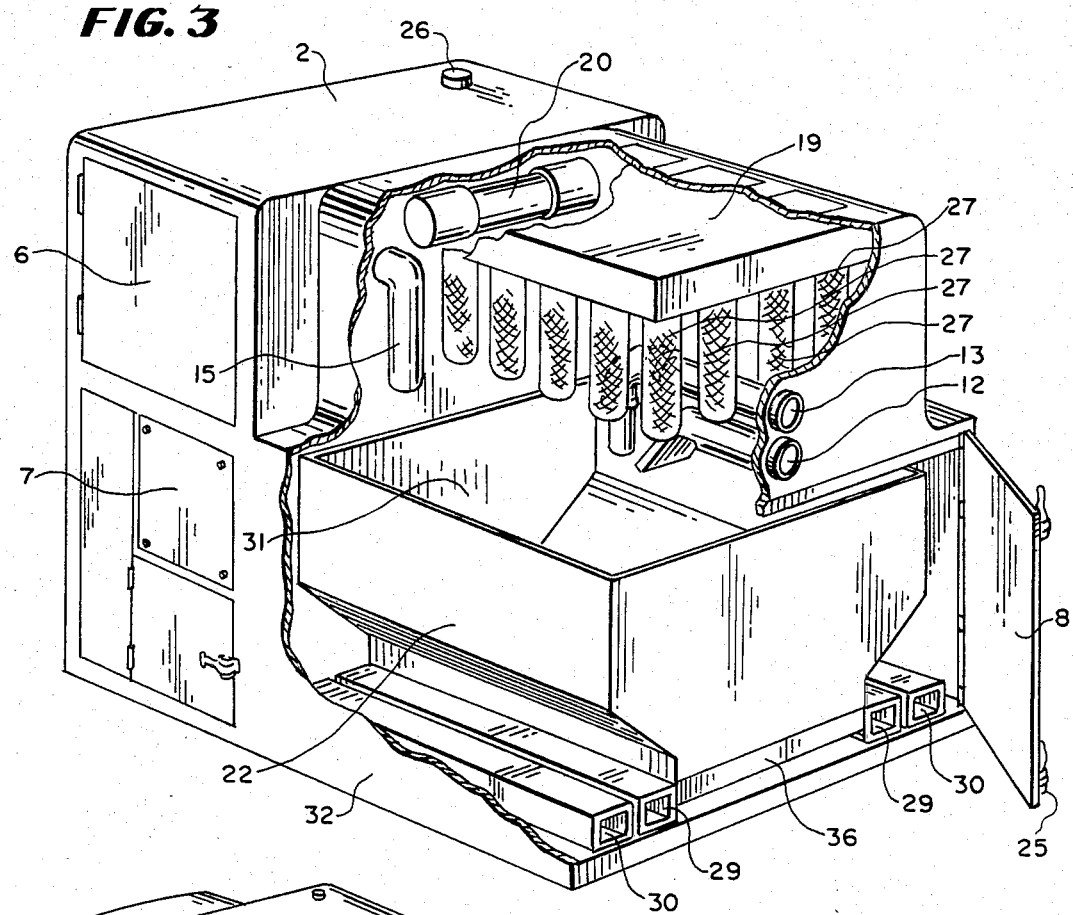
FIG. 3 is a perspective view with the left front portion of the invention shown in cutaway.

FIG. 3 is a perspective cutaway view showing the device looking rearward from the right front corner. The right side wall of the vacuum chamber, here partially cut-away, is shown at 32. This figure more clearly shows the disposition of the filter bag housing 19, several filter bags 27 and the dry-type secondary filter 20. Further revealed in FIG. 3 are the dry material intake 12, and wet material intake 13, with their discharge ends positioned near the center of the vacuum chamber, and located over the center of the internal waste collection container 22. Said container comprises the container body itself with forklift removal engagement channels 29, mounted on its bottom portion, and utilizes, in the preferred embodiment, a hopper floor 36. Further apparent in FIG. 3 are the top access panel 6 and lower right access panels 7, removable for access to the drive motor, drive and inlet piping assembly, and discharge piping assembly. The rear door is shown in its open position with the cam locking mechanisms 25 released.

Figure 4:
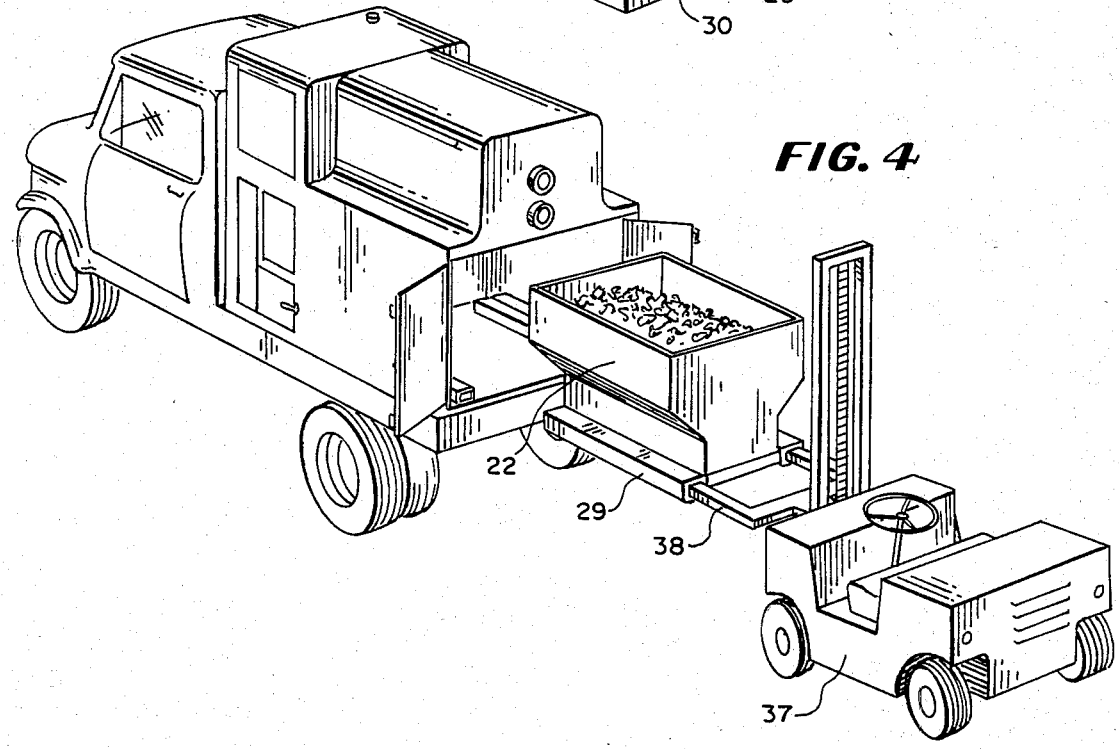
FIG. 4 is a perspective view of the preferred embodiment of the device and system in operation.

FIG. 4 is a perspective view of the vacuum cleaner unit waste collection and unloading system preferred embodiment in the unloading phase showing a standard forklift truck 37 with its fork members 38 engaging the forklift engagement channels 29.

In accordance with my invention, I claim:

1. An industrial vacuum cleaner comprising a housing having vacuum operated material intake means, a sealed vacuum chamber communicating with said intake means, said vacuum chamber having an upper and a lower portion, filter means for filtering matter operating in conjunction with blower intake means for generating vacuum in said vacuum chamber, and operative to draw material through said filter means, said blower intake means having an outlet for exhausting the airflow outwardly of the vacuum chamber coupled between said filter means and said blower intake means, means for channelling said airflow through said filter means, a partition being located within said housing and defining said vacuum chamber on one side thereof and the machinery chamber on the other side, and said blower being located within said machinery chamber, and isolated from said vacuum chamber and being in fluid communication with the vacuum chamber via said filter means, the improvement comprising; removable waste collection means disposed in the lower portion of said vacuum chamber, below said filter means for receiving the material drawn into the chamber through the intake means, the sealed vacuum chamber constituting an integral permanent component of said housing, said sealed vacuum chamber having sealing access means of larger dimensions than said waste collection means thereby permitting the removal of said waste collection means, said waste collection means being removably mounted in said vacuum chamber.

2. An industrial vacuum cleaner as claimed in claim 1, including bottom unloading means disposed on the bottom of said vacuum chamber for supporting said maste collection means above said bottom whereby fork members of a material handling apparatus may be inserted under said waste collection means.

3. An industrial vacuum cleaner as claimed in claim 1, said waste collection means comprising a container, said container including a bottom provided with unloading means, whereby fork members of a material handling apparatus may be engaged with said unloading means for the purpose of withdrawing said container from said vacuum chamber.

4. An industrial vacuum cleaner as claimed in claim 1, said waste collection means comprising a container made from liquid-tight and solvent-proof material, whereby said container is suitable for the collection of liquid or viscous waste, or solvents containing dissolved matter.

5. An industrial vacuum cleaner as claimed in claim 1, said waste collection means comprising a container having an upper portion peripherally filling said vacuum chamber and having an interconnecting lower portion having a hopper configuration having inwardly inclining floor sections merging into a central floor section having bottom opening doors for the discharge of waste.

6. An industrial vacuum cleaner as claimed in claim 5, said container being constructed of light, inexpensive, durable material having a disposable nature.

7. An industrial vacuum cleaner comprising a housing having first and second vacuum operated material intake means, a sealed vacuum chamber communicating with said intake means, said vacuum chamber having an upper and a lower portion, first and second filter means for filtering wet and dry matter operating in conjunction with blower intake means for generating vacuum in said vacuum chamber, and operative to draw material through said filter means, said blower intake means having an outlet for exhausting the airflow outwardly of the vacuum chamber coupled between said filter means and said blower intake means, control means for selectively channelling said airflow through said first or second filter means, a partition being located within said housing and defining said vacuum chamber on one side thereof and the machinery chamber on the other side, and said blower being located within said machinery chamber, and isolated from said vacuum chamber and being in fluid communication with the vacuum chamber via said filter means, the improvement comprising; removable waste collection means disposed in the lower portion of said vacuum chamber, below said filter means for receiving the material drawn into the chamber through the intake means, the sealed vacuum chamber constituting an integral permanent component of said housing, said sealed vacuum chamber having sealing access means of larger dimensions than said waste collection means thereby permitting the removal of said waste collection means, said waste collection means being removably mounted in said vacuum chamber.

8. An industrial vacuum cleaner as claimed in claim 7, including bottom unloading means disposed on the bottom of said vacuum chamber for supporting said maste collection means above said bottom whereby fork members of a material handling apparatus may be inserted under said waste collection means.

9. An industrial vacuum cleaner as claimed in claim 7, said waste collection means comprising a container, said container including a bottom provided with unloading means, whereby fork members of a material handling apparatus may be engaged with said unloading means for the purpose of withdrawing said container from said vacuum chamber.

10. An industrial vacuum cleaner as claimed in claim 7, said waste collection means comprising a container having an upper portion peripherally filling said vacuum chamber and having an interconnecting lower portion having a hopper configuration having inwardly inclining floor sections merging into a central floor section having bottom opening doors for the discharge of waste.

11. An industrial vacuum cleaner as claimed in claim 5, said container being constructed of light, inexpensive, durable material having a disposable nature.

12. An industrial vacuum cleaner as claimed in claim 7, said waste collection means comprising a container made from liquid-tight and solvent-proof material, whereby said container is suitable for the collection of liquid or viscous waste, or solvents containing dissolved matter.

* * * * *